United States Patent
Shi et al.

(10) Patent No.: US 12,512,659 B2
(45) Date of Patent: Dec. 30, 2025

(54) DIRECT CURRENT CIRCUIT BREAKER DEVICE AND CONTROL METHOD THEREFOR

(71) Applicant: Schneider Electric Industries SAS, Rueil-Malmaison (FR)

(72) Inventors: Zongqian Shi, Shanghai (CN); Xiangming Zeng, Shanghai (CN); Longfei Hao, Shanghai (CN); Jing Guo, Shanghai (CN); Min Li, Shanghai (CN); Gang Wang, Shanghai (CN); Xiaoqiang Lei, Shanghai (CN); Bingchang Wu, Shanghai (CN); Dabin Wu, Shanghai (CN); Hongwei Wu, Shanghai (CN); Haibo Huang, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 200 days.

(21) Appl. No.: 18/218,734

(22) Filed: Jul. 6, 2023

(65) Prior Publication Data
US 2024/0014645 A1    Jan. 11, 2024

(30) Foreign Application Priority Data
Jul. 6, 2022    (CN) .......................... 202210796833.8

(51) Int. Cl.
*H02H 3/087*    (2006.01)
*H01H 9/54*    (2006.01)
(Continued)

(52) U.S. Cl.
CPC ............ *H02H 3/087* (2013.01); *H01H 9/542* (2013.01); *H01H 9/547* (2013.01);
(Continued)

(58) Field of Classification Search
CPC ...... H01H 9/541; H01H 9/542; H01H 33/596; H02H 3/087
See application file for complete search history.

(56) References Cited

U.S. PATENT DOCUMENTS

| | | | |
|---|---|---|---|
| 2016/0329179 A1* | 11/2016 | Kim ..................... | H01H 33/596 |
| 2022/0246375 A1* | 8/2022 | Leusenkamp ........ | H01H 33/596 |
| 2023/0420928 A1* | 12/2023 | Meng ................... | H01H 33/596 |

FOREIGN PATENT DOCUMENTS

| | | |
|---|---|---|
| CN | 111030076 B | 6/2021 |
| EP | 4054037 A1 | 9/2022 |

(Continued)

OTHER PUBLICATIONS

Translation of JP 2003123569A. Apr. 25, 2003. (Year: 2003).*
(Continued)

*Primary Examiner* — Thienvu V Tran
*Assistant Examiner* — Christopher J Clark
(74) *Attorney, Agent, or Firm* — Kinney & Lange, P.A.

(57) ABSTRACT

A DC circuit breaker device is provided, including: a circuit breaker module including a first circuit breaker and a second circuit breaker connected in series with the first circuit breaker; a commutation module connected in parallel with the first circuit breaker and including a commutation capacitor, a commutation switch module and a commutation inductor connected in series; the commutation switch module including a commutation switch positive branch and a commutation switch negative branch; and a control module coupled to the circuit breaker module and the commutation module, and configured to control the switching on/off of the commutation switch positive branch and the commutation switch negative branch after the first circuit breaker is re-closed. A method of controlling a DC circuit breaker is also provided.

11 Claims, 5 Drawing Sheets

(51) Int. Cl.
  *H01H 33/59* (2006.01)
  *H02H 3/06* (2006.01)
  *H02H 1/00* (2006.01)

(52) U.S. Cl.
  CPC ............ *H01H 33/596* (2013.01); *H02H 3/06* (2013.01); *H02H 1/0007* (2013.01)

(56) References Cited

FOREIGN PATENT DOCUMENTS

| | | | | |
|---|---|---|---|---|
| JP | 2003123569 A | * | 4/2003 | |
| WO | 2021084585 A1 | | 5/2021 | |
| WO | WO-2022116043 A1 | * | 6/2022 | ............ H02H 3/087 |

OTHER PUBLICATIONS

Extended European Search Report dated Dec. 19, 2023 for corresponding European Patent Application No. 23306140.7-1201, 7 pages.

* cited by examiner

DIRECT CURRENT CIRCUIT BREAKER DEVICE AND CONTROL METHOD THEREFOR

TECHNICAL FIELD

The present disclosure relates to a DC (direct current) circuit breaker device, and a control method for the DC circuit breaker.

BACKGROUND

Multi-terminal flexible DC networks provide an effective way for large-scale intermittent renewable energy to be connected to the grid and consumed, but it faces the problem of being forced to stop the whole network due to local faults. A DC circuit breaker can quickly isolate regional faults, which is the core equipment for constructing DC power networks. In a flexible DC circuit system, after the DC circuit breaker completes a primary current disconnection, for the purpose of a control and protection strategy of a DC circuit system, the DC circuit breaker needs to have the ability of re-closing and immediately disconnecting the short-circuit current again after re-closing.

SUMMARY

The present disclosure relates to a DC circuit breaker device with re-closing function and a control method of a DC circuit breaker.

According to an aspect of the present disclosure, there is provided a DC circuit breaker device comprising: a circuit breaker module comprising a first circuit breaker and a second circuit breaker connected in series with the first circuit breaker for connecting a load and a DC power source in a DC circuit system; a commutation module connected in parallel with the first circuit breaker and comprising a commutation capacitor, a commutation switch module and a commutation inductor connected in series, the commutation switch module comprising a commutation switch positive branch and a commutation switch negative branch which are connected in parallel, the commutation switch positive branch and the commutation switch negative branch being capable of being controllably switched on/off, and a control module coupled to the circuit breaker module and the commutation module, and configured to control the switching on/off of the commutation switch positive branch and the commutation switch negative branch after the first circuit breaker is re-closed, so that the commutation capacitor is charged/discharged to a predefined polarity and voltage that satisfies a requirement for the first circuit breaker to disconnect again.

According to another aspect of the present disclosure, there is provided a control method comprising: in event of a short-circuit fault in a DC circuit system, controlling a first circuit breaker to disconnect and controlling a switching on of a commutation switch positive branch and a commutation switch negative branch to cause a current flowing through the first circuit breaker to cross zero; disconnecting a second circuit breaker after the current flowing through the first circuit breaker crosses zero; re-closing the first circuit breaker and switching on the commutation switch positive branch and the commutation switch negative branch to establish a first loop consisting of the first circuit breaker and the commutation module; detecting a polarity and voltage of a commutation capacitor and controlling on/off of the commutation switch positive branch and the commutation switch negative branch based on the detected polarity and voltage as well as a predefined polarity and voltage, so that the commutation capacitor is charged/discharged to the predefined polarity and voltage; and switching off the commutation switch positive branch and the commutation switch negative branch and re-closing the second circuit breaker when the voltage of the commutation capacitor is charged/discharged to the predefined polarity and voltage.

According to the embodiment of the present disclosure, a DC circuit breaker device with a fast re-closing function may be realized by controlling the switching on/off of the commutation branch to charge/discharge the commutation capacitor to a predefined polarity and voltage to that satisfies a requirement for the first circuit breaker to disconnect again. The DC circuit breaker device may have both fast connection/disconnection and fast re-closing functions through the commutation module, and have the ability to quickly extinguish the arc, and usage of a single commutation capacitor to quickly charge/discharge to the predefined polarity and voltage helps the DC circuit breaker device to quickly return to a state where it can be disconnected again. Moreover, embodiments of the present disclosure have the advantage of simple structure, low cost, and small footprint compared to conventional circuit breaker devices and methods which involve pre-charging the commutation capacitor.

BRIEF DESCRIPTION OF DRAWINGS

Aspects, features and advantages of the present disclosure will become clearer and easier to understand through the following description of embodiments in conjunction with the accompanying drawings, wherein.

DETAILED DESCRIPTION

Figure 1:
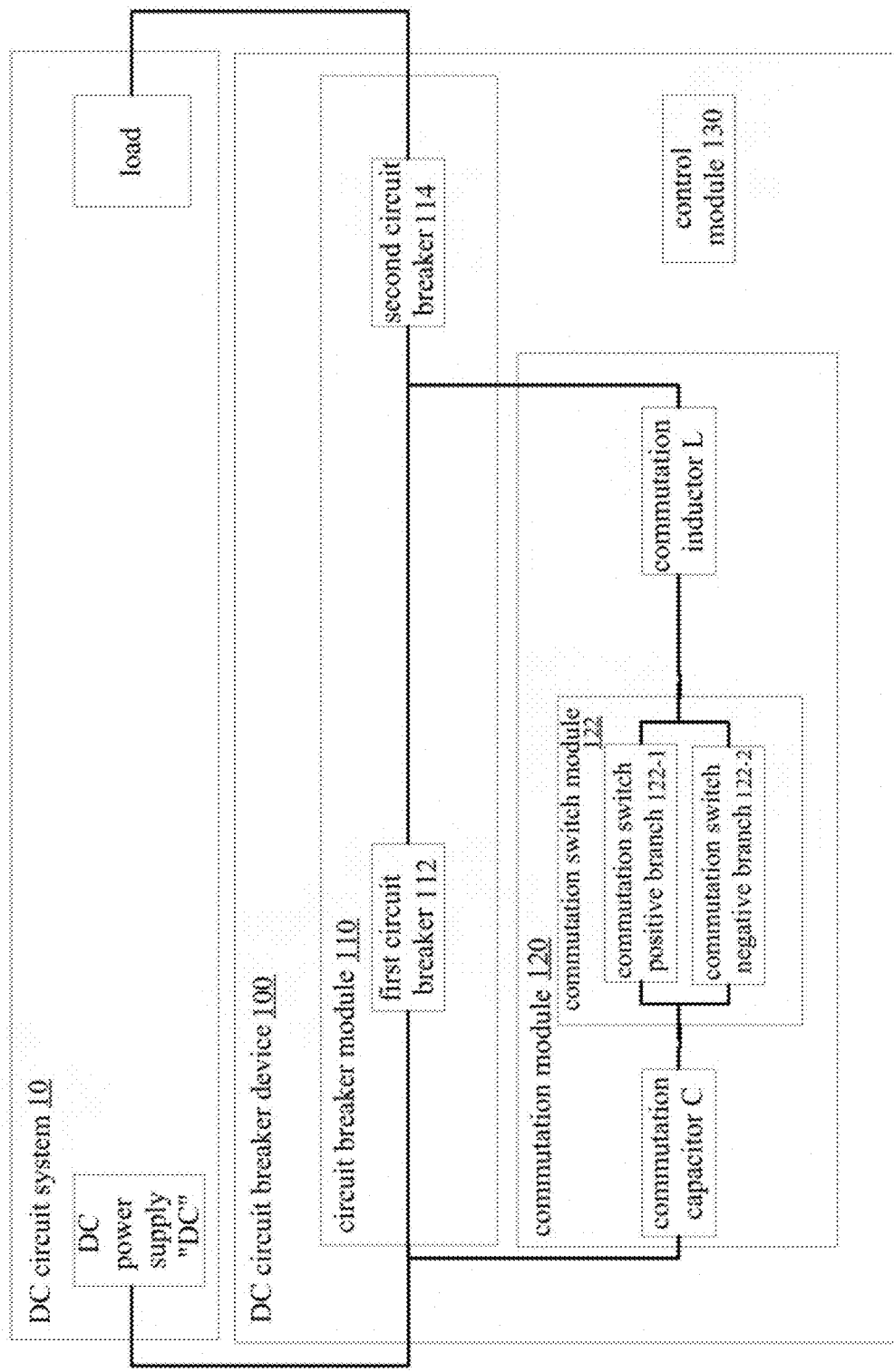
FIG. 1 illustrates a schematic module diagram of an embodiment of a DC circuit breaker device according to the present disclosure.

The present disclosure will be described in detail below with reference to exemplary embodiments of the present disclosure. However, the present disclosure is not limited to the embodiments described herein, and it may be implemented in many different forms. The embodiments described are intended only to make the present disclosure thorough and complete and to fully convey the ideas of the present disclosure to those skilled in the art. The features of the various embodiments described may be combined with or substituted for each other unless expressly excluded or should be excluded according to the context.

Unless otherwise defined, technical or scientific terms used in this disclosure shall have the common meaning as understood by persons having ordinary skill in the art to which this disclosure pertains. The terms "first", "second", and the like as used in this disclosure do not indicate any order, number, or importance, but are used only to distinguish the different components. Similarly, similar words such as "a", "an", or "the" do not indicate a numerical limitation, but rather the presence of at least one. Similar words such as "include" or "comprise" are intended to mean that the elements or objects appearing before the word cover the elements or objects listed after the word and their equivalents, and do not exclude other elements or objects. Similar words such as "coupled", "connected" or "interconnected" imply a physical or electrical connection, whether direct or indirect. The terms "up", "down", "left", "right", and the like are used only to indicate relative position relationships, and when an absolute position of the described object changes, the relative position may also change accordingly.

At present, after a conventional DC circuit breaker completes a short-circuit disconnection, the pre-charged commutation capacitor in the circuit breaker may change and needs to be restored to the initially set pre-charge voltage in a very short time such as tens of ms to hundreds of ms, in order to satisfy the requirement of short-circuit disconnection again after re-closing.

In order to satisfy the requirement of short-circuit disconnection again after re-closing, the conventional commutation capacitor using a pre-charging mode has many defects.

The first method is to use an external charging device to charge the commutation capacitor to restore to its pre-charge voltage. The disadvantage of this method is the slow charging speed and long charging time, such as charging time up to the order of 10 s. To reduce the charging time to tens of ms, the power of the charging device increases significantly, which will lead to the large volume and high cost of the charging device.

The second method is to use two sets of commutation capacitors that are respectively pre-charged. After one disconnection, the DC circuit system may disconnect one set of commutation capacitors that cannot satisfy the requirement of short-circuit disconnection again after re-closing, and switch to the other set of pre-charged commutation capacitors. Obviously, the introduction of additional commutation capacitors and charging device inevitably increases the volume and cost of DC circuit breaker device.

The third method is to connect an additional external pre-charged capacitor in parallel with the commutation capacitor in the DC circuit breaker device through a charging resistor. After the DC circuit breaker device is disconnected once, the additional external pre-charged capacitor charges/discharges the commutation capacitor of the DC circuit breaker device to restore to its pre-charged voltage through the resistor. The disadvantage of this method is that the capacity of the additional capacitor must be much larger than that of the commutation capacitor in order to restore the commutation capacitor voltage to the pre-charge voltage. Since the volume and cost of a capacitor are proportional to its capacity, the additional capacitor may significantly increase the volume and cost of the DC circuit breaker device. In addition, in order to reduce the impact of the additional capacitor on the disconnection process of the DC circuit breaker device, the resistance value of the charging resistor used needs to relatively large, but in order to shorten the charging time of the additional capacitor on the commutation capacitor, the resistance value of the charging resistor needs to be reduced, and there is a contradiction between the above two requirements.

Based on the above analysis, it can be seen that the current DC circuit breaker scheme with a fast re-closing function has many problems such as high cost, large volume, and contradictions in design.

In order to solve the above problems and to satisfy the demand for DC circuit breaker device by DC circuit systems such as DC grids, the present disclosure provides a DC circuit breaker device with a re-closing function, which has a simple structure, low cost and can realize the function of disconnecting and re-closing efficiently.

The specific structure of the DC circuit breaker device according to the present disclosure and the principle thereof will be described in detail below in conjunction with the accompanying drawings.

FIG. 1 illustrates a schematic module diagram of an embodiment of a DC circuit breaker device 100 according to the present disclosure. The DC circuit breaker device 100 as shown in FIG. 1 includes a circuit breaker module 110, a commutation module 120, and a control module 130. To facilitate a better illustration of the DC circuit breaker device 100, FIG. 1 also schematically illustrates a DC circuit system 10, which may include a DC power supply "DC" and a load. The DC circuit system 10 utilizes the DC circuit breaker device 100 to isolate the fault in event of a short-circuit fault and to re-close the circuit breaker.

The circuit breaker module 110 in the DC circuit breaker device 100 may include a first circuit breaker 112 and a second circuit breaker 114 connected in series with the first circuit breaker 112. The circuit breaker module 110 may be used to connect the load in a DC circuit system to the DC power supply "DC". As an example, the first circuit breaker 112 may be a mechanical switch. Two contacts of the first circuit breaker are mechanically separated by a certain distance in the case of disconnecting, and the current crosses the distance between the two contacts to form an arc. The DC arc flowing through the first circuit breaker 112 cannot be extinguished naturally because the current generated by the short-circuit fault of the DC circuit system is DC and has no natural zero-crossing point. Therefore, it is necessary to use the commutation module to make the arc of the first circuit breaker extinguished. When the arc is extinguished, there is no longer a short-circuit current on the first circuit breaker 112. The second circuit breaker 114 may be a mechanical switch. In alternative embodiments, the second circuit breaker 114 may also be a solid-state switch. Compared to the solid-state switch without a contact, the mechanical switch has advantages such as low cost and low loss and.

The commutation module 120 may be connected in parallel with the first circuit breaker 112. Also, the commutation module 120 may include a commutation capacitor C, a commutation switch module 122, and a commutation inductor L connected in series. The commutation switch module 122 includes a commutation switch positive branch 122-1 and a commutation switch negative branch 122-2 connected in parallel, with the commutation switch positive branch 122-1 and the commutation switch negative branch 122-2 capable of being controllably switched on/off. The commutation capacitor C satisfies a predefined polarity and voltage when the first circuit breaker is disconnected. The circuit of the commutation capacitor C and the commutation inductor L may generate an oscillating current with a higher amplitude that may be used to superimpose with the current flowing across the electrodes of the first circuit breaker to generate a zero-crossing current. In an example, the commutation switch positive branch 122-1 and the commutation switch negative branch 122-2 in the commutation switch module 122 may include controllable semiconductor switch devices to implement the switching on/off of the branch, and the specific configuration of the controllable switch devices may be described in detail below with respect to FIG. 3. The commutation switch positive branch 122-1 indicates that the current can only pass in the positive direction, and the commutation switch negative branch 122-2 indicates that the current can only pass in the negative direction. The positive direction indicates the same direction as the current direction during normal operation of the first and second circuit breakers.

The control module 130 may be coupled to the circuit breaker module 110 and the commutation module 120 for monitoring and controlling the circuit breaker module 110 and the commutation module 120. The control module 130 may be configured to control the switching on/off the commutation switch positive branch 122-1 and the commutation switch negative branch 122-2 after the first circuit breaker 112 is re-closed such that the commutation capacitor C is charged/discharged to a predefined polarity and voltage that satisfies a requirement for the first circuit breaker 112 to disconnect again. For example, the control module 130 may apply control signals to the semiconductor switch devices in the two branches to control the switching on or switching off of the positive and negative branches. The control module 130 may be equipped with functions such as detection, calculation, and control and so on. These functions may be implemented by hardware, software, firmware, or a combination thereof. For example, a detection unit in the form of hardware may also be integrated into the control module 130. The specific operation method of the control module 130 may refer to the description below based on the flowchart of FIG. 6.

Figure 2:
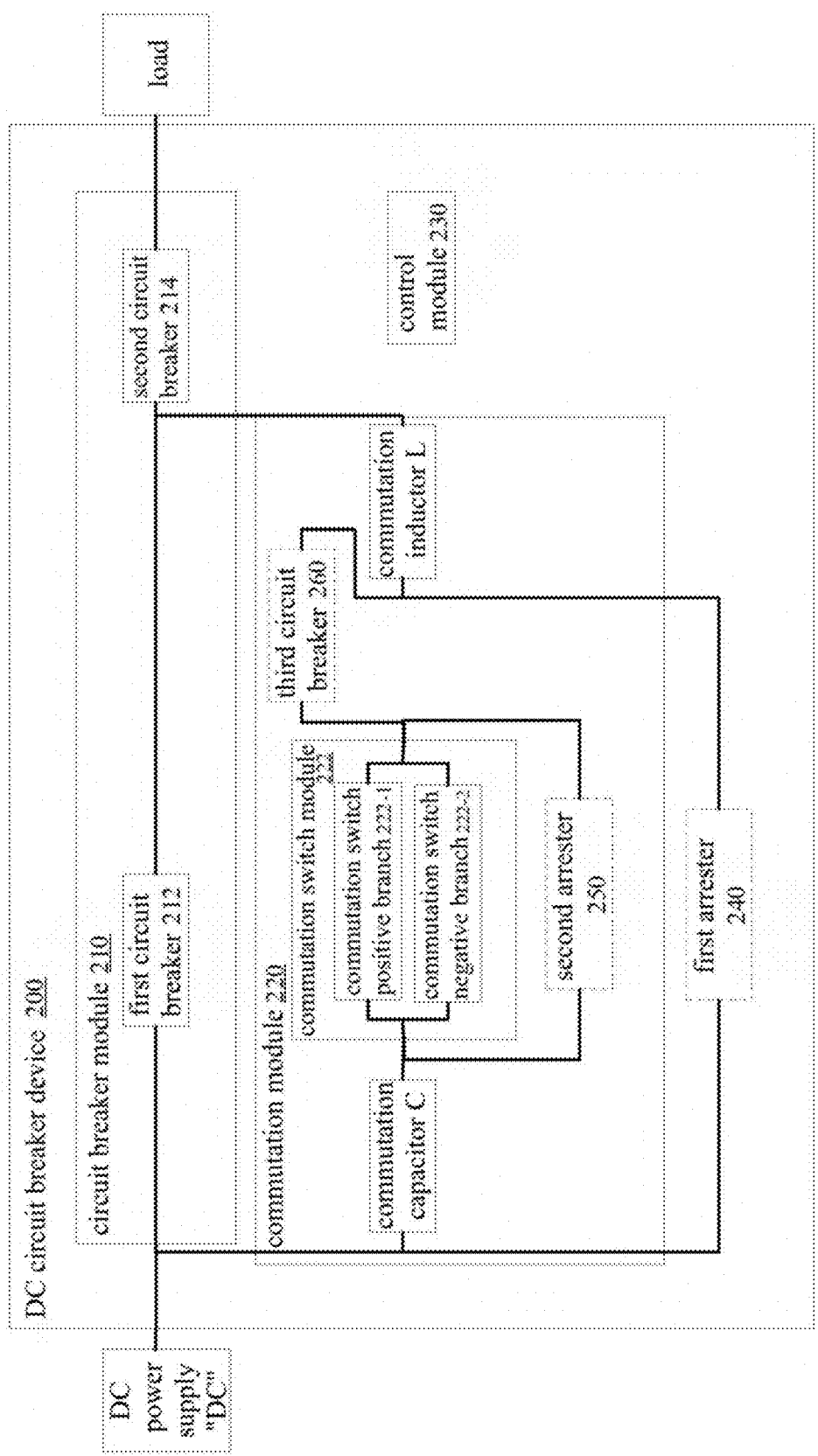
FIG. 2 illustrates a schematic module diagram of another embodiment of a DC circuit breaker device according to the present disclosure.

FIG. 2 illustrates a schematic module diagram of another embodiment of a DC circuit breaker device 200 according to the present disclosure. The DC circuit breaker device 200 as shown in FIG. 2 includes a circuit breaker module 210, a commutation module 220, and a control module 230. The specific configuration and description of the circuit breaker module 210, the commutation module 220, and the control module 230 in FIG. 2 may refer to the specific description of the circuit breaker module 110, the commutation module 120, and the control module 130 in conjunction with FIG. 1 and will not be repeated herein.

Optionally, the DC circuit breaker device 200 may also include a first arrester 240 connected in parallel with a series circuit formed by the commutation capacitor C and the commutation switch module 222. For example, the first arrester 240 may be configured to absorb energy when the voltage on across the first circuit breaker 112 reaches an operating voltage of the first arrester 240. For example, the first arrester 240 may include a metal oxide variable resistor type arrester, also referred to as an MOV arrester. The first arrester 240 may be used to limit excessive overvoltage across the first circuit breaker 112 and to absorb energy during the connection/disconnection of the DC circuit.

Optionally, the commutation module 220 may also include a second arrester 250 connected in parallel with the commutation switch module. The second arrester 250 may be used to absorb energy of the commutation capacitor C when the voltage of the commutation capacitor C is greater than an operating voltage of the second arrester. For example, the second arrester 250 may be used to protect the commutation switch module 222 from being impacted by an excessive overvoltage on the commutation switch module 222 when the voltage of the commutation capacitor C is relatively large, thereby protecting the commutation switch module. Similarly to the first arrester, the second arrester may include a metal oxide variable resistor type arrester, also known as an MOV arrester. Of course, the choice of the arrester of the present disclosure is not limited to this. The second arrester 250 helps to quickly reduce the voltage across the commutation capacitor C.

Optionally, the commutation module 220 may also include a third circuit breaker 260 connected in series with the commutation switch module 222. When the first circuit breaker 212 is disconnected and the second circuit breaker 214 is not disconnected, the commutation module 220 including the third circuit breaker 260 forms a loop together with the DC circuit system (hereinafter referred to as a second loop), in which a reverse overvoltage may be applied to the commutation switch module 222, the reverse overvoltage may damage the commutation switch module 222. In this case, the commutation switch module 222 can be protected from being damaged by disconnecting the third circuit breaker 260. For example, the third circuit breaker 260 can be quickly disconnected when a oscillation residual current flowing through the third circuit breaker 260 crosses zero to avoid the DC circuit system applying a reverse overvoltage to the converter switch module 222.

The first arrester 240, the second arrester 250 and the third circuit breaker 260 mentioned above are independent of each other, and the DC circuit breaker device may include one or more of the first arrester 240, the second arrester 250 and the third circuit breaker 260.

Specific configuration examples of the commutation switch module are set forth in detail below in conjunction with FIGS. 3 and 4.

Figure 3:
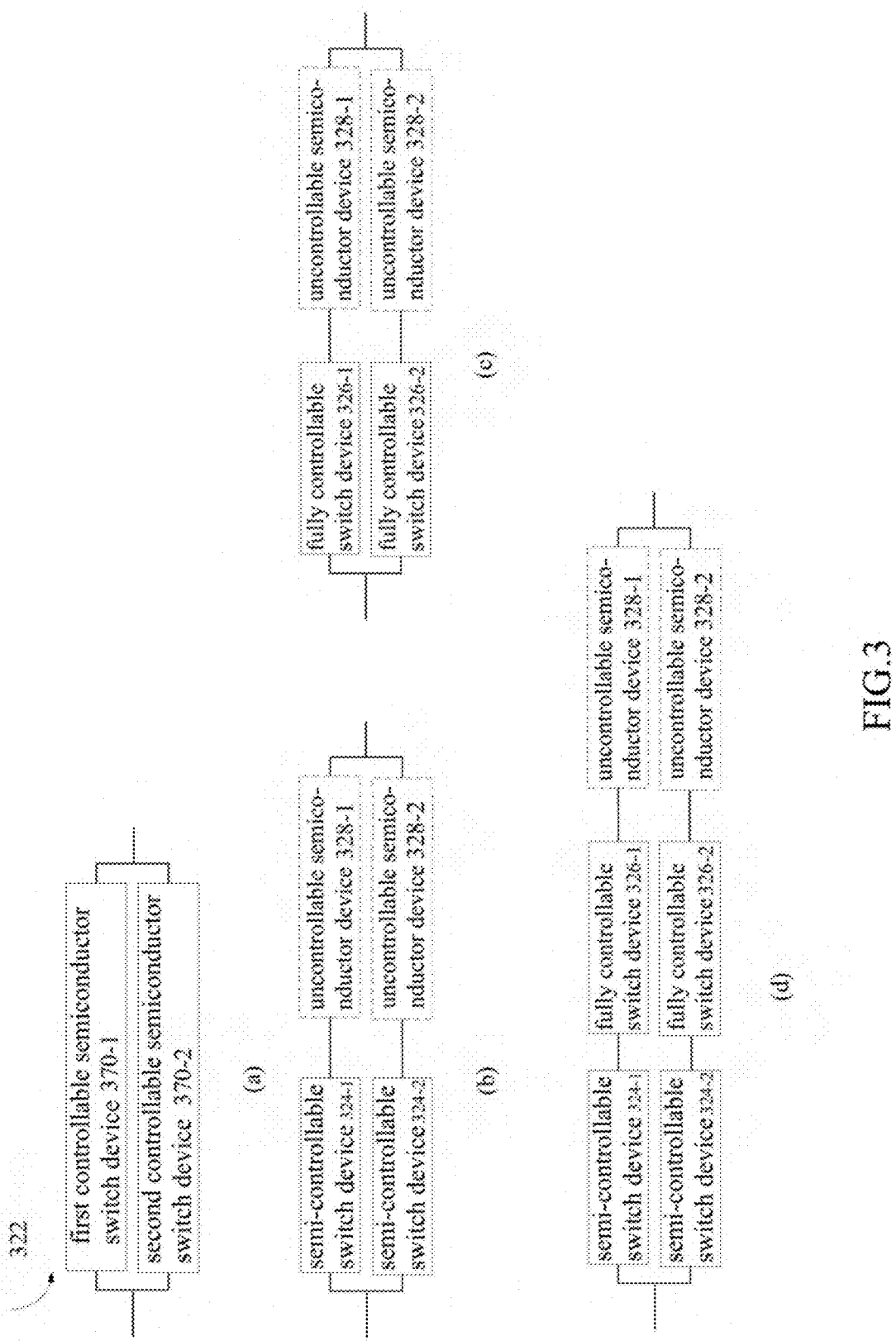
FIG. 3 illustrates a schematic module diagram of a plurality of embodiments of a commutation switch module according to the present disclosure.

FIG. 3 illustrates a schematic module diagram of multiple embodiments of a commutation switch module 322 according to the present disclosure. For purposes of description, FIG. 3 illustrates only four embodiments of the commutation switch module 322, but the present disclosure is not limited thereto. FIG. 4 illustrates a schematic module diagram of an embodiment of a variation of the reverse parallel mode of the commutation switch module 422 according to the present disclosure.

As shown in FIG. 3(*a*), the commutation switch positive branch may include a first set of semiconductor devices, and the first set of semiconductor devices includes at least one first controllable semiconductor switch device 370-1 for controlling switching on of the commutation switch positive branch in a positive direction. The commutation switch negative branch includes a second set of semiconductor devices, and the second set of semiconductor devices includes at least one second controllable semiconductor switch device 370-2 for controlling switching on of the commutation switch negative branch in a negative direction. The first and second controllable semiconductor switch devices 370-1 and 370-2 may be any controllable semiconductor switch device, such as an insulated gate bipolar transistor (IGBT), a metal oxide semiconductor field effect transistor (MOSFET), a thyristor, etc. In addition, a series connection of multiple controllable semiconductor switch devices 370-1 and 370-2 may be used to realize voltage division, so as to reduce the damage of high-voltage signals to the switching devices.

As shown in FIGS. 3(*b*)-3(*d*), the at least one first controllable semiconductor switch device 370-1 and the at least one second controllable semiconductor switch device 370-2 may respectively include at least one semi-controllable semiconductor switch device 324-1, 324-2, at least one fully controllable semiconductor switch device 326-1, 326-2, or a combination of both. The number of semi-controllable semiconductor switch devices 324-1, 324-2 may be different from the number of fully controllable semiconductor switch devices 326-1, 326-2. Optionally, the first set of semiconductor devices further includes at least one first uncontrollable semiconductor device 328-1 connected in series with the at least one first controllable semiconductor switch device 370-1; and the second set of semiconductor devices further includes at least one second uncontrollable semiconductor device 328-2 connected in series with the at least one second controllable semiconductor switch device 370-2. That is, the first set of semiconductor devices and the second set of semiconductor devices may include semi-controllable semiconductor switch devices 324-1, 324-2 and/or fully controllable semiconductor switch devices 326-1, 326-2, respectively, and may also include uncontrollable semiconductor devices 328-1, 328-2 connected in series with above switch devices.

The uncontrollable semiconductor devices 328-1, 328-2 represent semiconductor devices that cannot be controlled to switch on/off. As an example, the uncontrollable semiconductor devices 328-1, 328-2 may be diodes. The materials of the uncontrollable semiconductor devices 328-1, 328-2 may include various semiconductor materials commonly used for diodes, such as silicon, germanium, etc. The uncontrollable semiconductor devices 328-1, 328-2 may have the ability of unidirectional conduction, that is, the uncontrollable semiconductor devices 328-1, 328-2 are switched on when a forward voltage is applied to their anodes and cathodes, and the uncontrollable semiconductor devices 328-1, 328-2 are switched off when a reverse voltage is applied to the anodes and cathodes. In other words, the switching on/off of the device depends only on the polarity of the voltage applied to it.

As for semi-controllable semiconductor switch devices 324-1, 324-2, the switching on of the devices may be controlled by receiving control signals through control electrodes such as gates. The switching off of the devices may not be controlled by control signals but they can automatically switch off when the current crosses zero. Semi-controllable semiconductor switch devices include, for example, thyristors. Therefore, the control module 130, 140 may provide control signals to the control electrodes of the semi-controllable semiconductor switch devices 324-1, 324-2 to control their switching on. However, the switching off of the semi-controllable semiconductor switch devices 324-1, 324-2 will not be controlled by control signals. Therefore, when the supply of the control signals to the control electrodes is stopped, the semi-controllable semiconductor switch devices 324-1, 324-2 will remain the switching on state until they automatically switch off when their current crosses zero.

Fully controllable semiconductor switch devices 326-1 and 326-2 indicate that the switching on/off of the devices may be controlled by control signals. Fully controllable semiconductor switch devices include, for example, integrated gate commutated thyristor (IGCT), insulated gate bipolar transistor (IGBT), and metal oxide semiconductor field effect transistor (MOSFET). Since the fully controllable semiconductor switch devices 326-1, 326-2 may be switched off directly by a control signal, the fully controllable semiconductor switch devices 326-1, 326-2 may be switched off quickly, in particular, they may be quickly switched off when no current is detected on the first circuit breaker 112, 212, so as to protect the commutation switch module from large surges in the DC current system, thereby protecting the current switch branches.

Optionally, the first and second sets of semiconductor devices 370-1, 370-2 have the same combination of semiconductor switch devices and are connected in a reverse parallel mode. Specifically, two different reverse parallel modes may be used to implement the commutation switch module. For example, a basic reverse parallel mode may be used, that is, the semiconductor switch devices in the commutation switch positive and negative branches are respectively connected in series and then in reverse parallel overall. The reverse parallel mode indicates that the polarities of the devices in the positive and negative branches are in opposite directions, and thus the current flows in opposite directions. Alternatively, a variation of the reverse parallel mode may be used, i.e. one or both ends of the corresponding one or more semiconductor switch devices in the commutation switch positive branch and the commutation switch negative branch may be connected on the basis of the basic reverse parallel mode.

Figure 4:
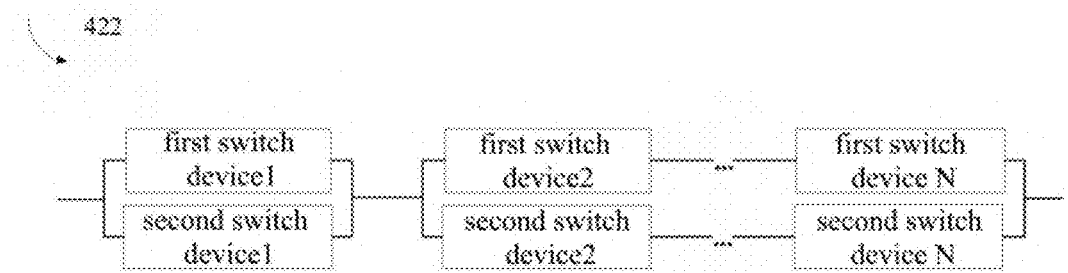
FIG. 4 illustrates a schematic module diagram of an embodiment of a variation of the reverse parallel mode of the commutation switch module according to the present disclosure.

FIG. 4 illustrates a variation of a reverse parallel mode in which a first switch device 1 and a second switch device 1 are connected in reverse parallel to form a first reverse parallel circuit, first switch devices 2 to N connected in series and second switch devices 2 to N connected in series are connected in overall reverse parallel to form a second reverse parallel circuit, where N is an integer greater than 2. The first reverse parallel circuit is connected in series with the second reverse parallel circuit to form a commutation switch module. FIG. 4 is only a schematic illustration of an example of a variation of the reverse parallel mode, and other variations of the reverse parallel mode may be considered in specific embodiments, for example, any pair out of the first switch devices 2 to N and the second switch devices 2 to N may be connected in a mode such as the first switch device 1 and the second switch device 1. In FIG. 4, switching on directions of the first switch devices 1 to N are the same, and switching on directions of the second switch devices 1 to N are the same and opposite to those of the first switch devices 1 to N.

The semiconductor devices in FIGS. 3(*b*)-3(*d*) may also be connected in a variation of the reverse parallel mode as shown in FIG. 4.

Figure 5:
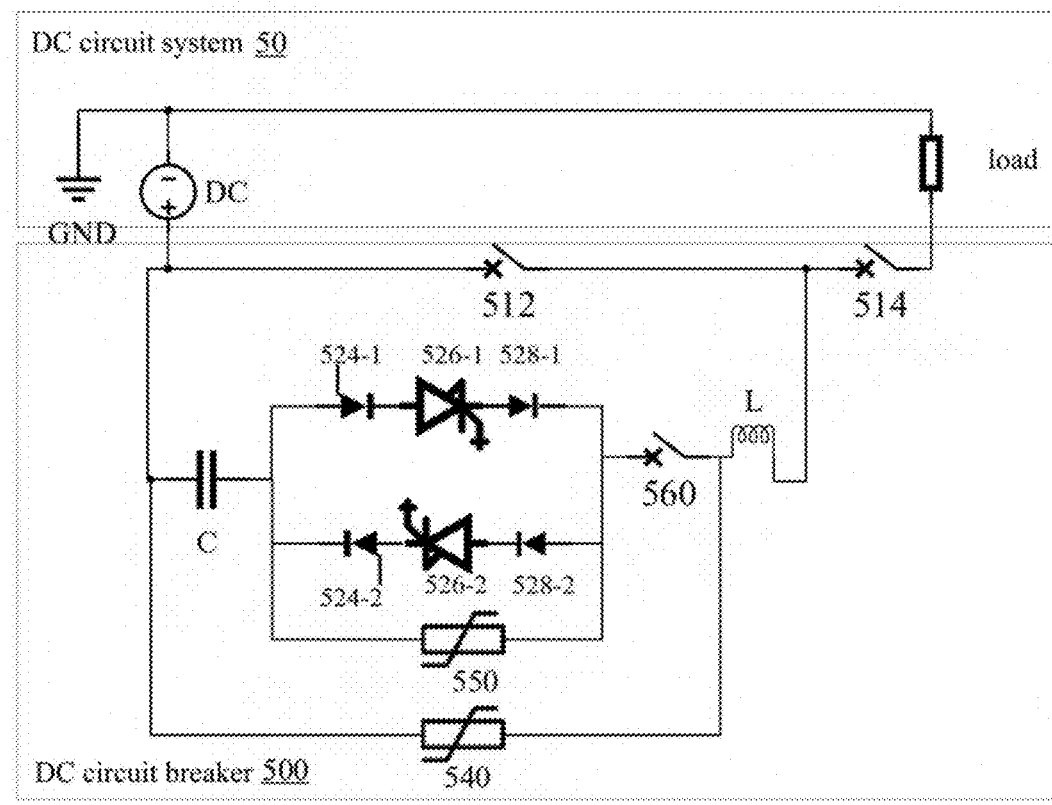
FIG. 5 illustrates a schematic circuit diagram of an embodiment of a DC circuit breaker device according to the present disclosure.

FIG. 5 illustrates a schematic circuit diagram of a specific embodiment of a DC circuit breaker device 500 according to the present disclosure, in which the above mentioned reverse parallel semiconductor devices are applied. The first circuit breaker 512, the second circuit breaker 514, the commutation capacitor C, the commutation inductor L, the commutation switch module (comprised of, for example, thyristors 524-1, 524-2; IGCTs 526-1, 526-2; diodes 528-1, 528-2), the first arrester 540, the second arrester 550, and the third breaker 560 of FIG. 5 may refer to the corresponding devices in the DC circuit breaker 100 described in detail in FIG. 1, and the corresponding devices in the DC circuit breaker 200 as described in detail in FIG. 2.

The specific characteristics of the thyristors 524-1, 524-2; IGCTs 526-1, 526-2; and diodes 528-1, 528-2 shown in the commutation switch module may refer to the specific descriptions of the commutation switch modules 322, 422 in FIGS. 3 and 4. The combination of switch devices 524-1, 526-1, 528-1 in the commutation branch constitutes the commutation switch positive branches 122-1, 222-1, and the combination of switch devices 524-2, 526-2, 528-2 constitutes the commutation switch negative branches 122-2, 222-2. The semi-controllable and fully-controllable switch devices in each branch may be switched on or off simultaneously by the same control signal.

The circuit diagram shown in FIG. 5 is only schematic and is not intended to limit the topology of the commutation switch module. For example, each of the switch devices of the commutation switch positive branch and negative branch may be connected in the variation of the reverse parallel mode as described previously. For another example, the position of the commutation inductor may be adjusted as desired, such as on the left side of the commutation module of FIG. 5, or on the left side of capacitor C. Also, the positions of the load and the DC power supply "DC" may be interchanged.

Figure 6:
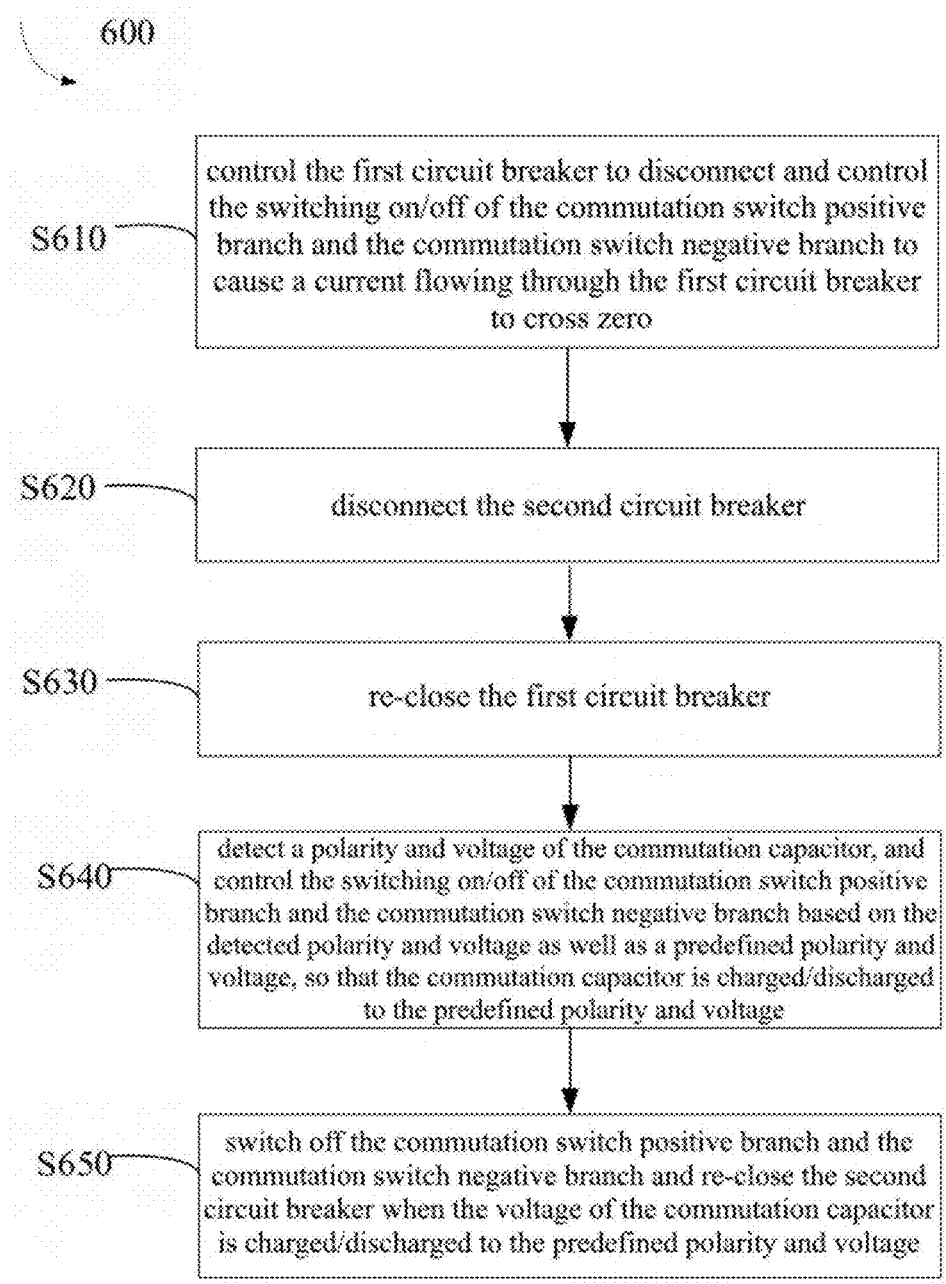
FIG. 6 illustrates a flowchart of an embodiment of a control method according to the present disclosure.

The control method for the DC circuit breaker device 100, the DC circuit breaker device 200, and the DC circuit breaker device 500 according to the present disclosure will be described in detail below in connection with FIG. 6. The control method may be performed by the DC circuit breaker device 100 as shown in FIG. 1, the DC circuit breaker device 200 as shown in FIG. 2, and the DC circuit breaker device 500 as shown in FIG. 5, for example by the control modules 130, 230.

At step S610, in event of a short-circuit fault in the DC circuit system, the first circuit breaker is controlled to disconnect and the switching on/off of the commutation switch positive branch and the commutation switch negative branch is controlled to cause a current flowing through the first circuit breaker to cross zero.

At step S620, after the current flowing through the first circuit breaker crosses zero, the second circuit breaker is disconnected.

At step S630, the first circuit breaker is re-closed and the commutation switch positive branch and the commutation switch negative branch are switched on to establish a first loop consisting of the first circuit breaker and the commutation module.

At step S640, a polarity and voltage of the commutation capacitor is detected, and the switching on/off of the commutation switch positive branch and the commutation switch negative branch is controlled based on the detected polarity and voltage as well as a predefined polarity and voltage, so that the commutation capacitor is charged/discharged to the predefined polarity and voltage.

At step S650, the commutation switch positive branch and the commutation switch negative branch are switched off and the second circuit breaker is re-closed when the voltage of the commutation capacitor is charged/discharged to the predefined polarity and voltage.

For step S610, taking the DC circuit breaker device 100 of FIG. 1 as an example, the control module 130 controls the first circuit breaker 112 to disconnect in event of a short-circuit fault in the DC circuit system. At this time, an arc is formed between the contacts of the first circuit breaker 112, and the control module 130 may simultaneously trigger the commutation switch positive branch and the commutation switch negative branch to switch on, and the commutation capacitor C and the commutation inductor L form LC oscillation circuit to generate a reverse oscillation current superimposed on the current flowing through the first circuit breaker, so that the current flowing through the first circuit breaker crosses zero, and the arc is extinguished. In other words, the control module 130 controls the commutation switch positive branch 122-1 and the commutation switch negative branch 122-2 to switch on to generate an oscillating current superimposed on the DC current flowing through the first circuit breaker 112, such that the current flowing through the first circuit breaker 112 crosses zero.

For step S620, taking the DC circuit breaker device 100 of FIG. 1 as an example, after the current of the first circuit breaker 112 crosses zero and the arc is extinguished, the second circuit breaker 112 is disconnected. Specifically, after the current of the first circuit breaker 112 crosses zero, the oscillating current is transferred to the commutation switch module 122 and the second loop formed by the DC circuit system 10 and the commutation module 120 is coupled and oscillated, creating a residual current. During the oscillation of the DC circuit system 10 and the commutation module 120, the residual current flowing through the second circuit breaker 114 is cut off by controlling the switching on/off of the commutation switch positive branch and/or the commutation switch negative branch. For example, the current flowing through the commutation switch positive branch and/or the commutation switch negative branch and the second circuit breaker 114 in the second loop may be made to cross zero to cut off the residual current. For example, the control module 130 may detect the current flowing through the second circuit breaker 114 and may ensure that the second circuit breaker 114 is completely disconnected for subsequent execution of the re-closing operation of the DC circuit breaker when the current flowing through the second circuit breaker 114 has been cut off for a predefined period of time.

Specific embodiments of cutting off residual current when the residual current crosses zero are illustrated exemplarily below. In some examples, the voltage polarity of the commutation capacitor C may be detected, and based on the detected polarity, a control signal for switching on may be selectively stopped from sending to the controllable switch devices in one of the commutation switch positive branch 122-1 and the commutation switch negative branch 122-2, so that the commutation switch positive branch 122-1 or the commutation switch negative branch 122-2 is switched off at the next zero-crossing point. For example, when the right side of the commutation capacitor C is positive, the control signal for switching on of the commutation switch negative branch 122-2 is cancelled, so that the commutation switch positive branch 122-1 is switched off at the next zero-crossing point, and at this time, the polarity of the commutation capacitor C turns negative, which is expected. In this case, the control module 130 may control the magnitude and polarity of the remaining voltage of the commutation capacitor C when the current crosses zero. Alternatively, the residual current is directly cut off by controlling the switching off of the fully controllable switch device (as indicated by 326-1, 326-2 in FIG. 3) through a control signal. In alternative embodiments, it is also possible to cut off the residual current via the second circuit breaker 114 at zero-crossing point, at which time the voltage remaining on the commutation capacitor C is random. This randomness may be based on the dispersion of the mechanical movement of the contacts and the different conditions of the external load circuit, so that the polarity and amplitude of the residual voltage are random.

Alternatively, taking FIG. 2 as an example, if the third circuit breaker (as indicated by 260 in FIG. 2) is selected, the residual current may also be cut off by the third circuit breaker when the residual current crosses zero, and the remaining voltage on the commutation capacitor is also random at this time.

For step S630, taking the DC circuit breaker device 100 of FIG. 1 as an example, the first circuit breaker 112 is re-closed by the control module 130 if both the first and second circuit breakers are disconnected or if no current is detected on either of the first and second circuit breakers. Specifically, the control module 130 re-closes the first circuit breaker 112 but does not close the second circuit breaker 114 to allow for, after subsequent switching on of the commutation switch module, connecting the commutation module 120 to the first circuit breaker 112 to build the first loop.

In some examples, in the case that the second arresters 250, 550 in the commutation module as in FIGS. 2 and 5 are selected, the excessive energy stored in the commutation capacitor C is first released by the second arresters 250, 550 after the first circuit breaker is re-closed and before controlling to switch on the commutation switch 222. In some examples, for example, the voltage across the commutation capacitor C is reduced to a specified voltage value, for example, to approximately the operating voltage values of the second arresters 250, 550.

In some examples, in the case that the third circuit breakers 260, 560 in the commutation module of FIGS. 2, 5 are selected, the third circuit breaker 260 is re-closed to ensure the construction of the first loop.

For step S640, taking the DC circuit breaker device 100 of FIG. 1 as an example, the control module 130 detects the polarity and voltage of the commutation capacitor C and, based on the detected polarity and voltage and the predefined polarity and voltage, controls the switching on of the commutation switch positive branch 122-1 and the commutation switch negative branch 122-2, so that the commutation capacitor C is charge/discharge to the predefined polarity and voltage. However, an excessively high voltage of the commutation capacitor C, for example, five times, ten times or even higher than the predefined voltage amplitude, may lead to difficulty in extinguishing the arc when the DC circuit system 10 encounters a short-circuit fault again. Therefore, it is necessary to reduce the voltage of the commutation capacitor C to a predefined voltage and the polarity of the capacitor remains at a predefined polarity by means of the operation of charging/discharging the commutation capacitor C, so that the commutation capacitor C and the commutation inductor L generate an oscillating current with a zero-crossing point to extinguish the arc. Moreover, the predefined polarity and voltage of the commutation capacitor C may be adjusted according to specific circuit settings, as long as it matches the parameters of the inductor L to form an oscillating current, which can be set to be superimposed on the current flowing through the first circuit breaker 112 to extinguish the arc between the contacts.

In an alternative embodiment of step S640, taking the DC circuit breaker device 100 shown in FIG. 1 as an example, the control module 130 switches on the commutation switch positive branch 122-1 and the commutation switch negative branch 122-2 alternately, and detects the polarity and voltage of the commutation capacitor C and switches the switching on of the commutation switch positive branch 122-1 and the commutation switch negative branch 122-2 at the zero-crossings of current of the first loop, until the polarity and voltage of the commutation capacitor satisfy the predefined polarity and voltage. Specifically, a first polarity and voltage of the commutation capacitor C is detected when the commutation switch positive branch 122-1 is controlled to be switched on and a first portion of the current generated in the first loop crosses zero. For example, the first portion of the current may be a positive sinusoidal half-wave with a zero-crossing point. The controller 130 determines whether the detected first polarity and voltage satisfy the predefined polarity and voltage. Based on the determination that the detected first polarity and voltage do not satisfy the predefined polarity and voltage, the switching on of the commutation switch negative branch 122-2 is controlled to generate a second portion of the current, and a second polarity and voltage of the commutation capacitor is detected when the generated second portion of the current crosses zero. For example, the first portion of the current may be a negative sinusoidal half-wave with a zero-crossing point. The controller 130 determines whether the detected second polarity and voltage satisfy the predefined polarity and voltage. Based on the determination that the detected second polarity and voltage do not satisfy the predefined polarity and voltage, the switching on of the commutation switch positive branch 122-1 is again controlled to generate the first portion of the current. The above steps are repeated so that the commutation switch positive branch and the commutation switch negative branch are switched on alternately until the polarity and voltage of the commutation capacitor satisfy the predefined polarity and voltage. This real-time operation of detection of the polarity and voltage facilitates the determination of whether to continue controlling the switching on of the commutation switch positive branch 122-1 or the commutation switch negative branch 122-2, so as to precisely and stably control the charging and discharging operation of the commutation capacitor C.

In another alternative embodiment of step S640, step S640 may further comprise: detecting, after re-closing the first circuit breaker, the polarity and voltage of the commutation capacitor in an initial state; calculating, according to the detected polarity and voltage in the initial state and the predefined polarity and voltage, the number of zero crossings of current of the first loop required to charge/discharge the commutation capacitor from the polarity and voltage in the initial state to the predefined polarity and voltage, and based on the number of zero crossings of current of the first loop, controlling the switching on/off of the commutation switch positive branch and the commutation switch negative branch so that the commutation switch positive branch and the commutation switch negative branch are switched off after the current of the first loop crosses zero up to the number of zero crossings of current. For example, the polarity and voltage of the commutation capacitor C may be detected when the commutation switch module 122 is not switched on. Alternatively, the polarity and voltage of the commutation capacitor C may also be detected while the commutation switch module 122 is switching on. The present disclosure does not limit this.

In some examples, a specific implementation of the above-mentioned calculation of the number of zero crossings of current comprises obtaining, during a test phase prior to being put into use, an oscillation curve of the voltage of the commutation capacitor C over time and aligning the maximum magnitude (which corresponds to a change in polarity) of the voltage in the oscillation curve at each oscillation cycle with the zero crossings of the current generated in the first loop in time. The polarity and voltage at the initial state (i.e., the initial point) and the predefined polarity and voltage (i.e., the end point) and the initial zero crossing of current and the final zero crossing of current corresponding to the initial point and the end point are then obtained, and the number of zero crossings of current is calculated based on the determined initial zero crossing of current and the final zero crossing of current. In particular, the number of zero crossings of current in the first circuit when recovering from the polarity and voltage at the initial state to the predefined polarity and voltage passes corresponds to the number of polarity changes of the commutation capacitor C. At each zero crossing of current, the polarity of the commutation capacitor C changes. Moreover, the maximum oscillation amplitude of the voltage of the commutation capacitor C gradually decreases as the number of zero crossings of current increases. This method allows fast charging/discharging of the commutation capacitor to predefined polarity and voltage without the need of real-time detection.

For step S650, taking the DC circuit breaker device 100 of FIG. 1 as an example, when the voltage of the commutation capacitor C is charged/discharged to a predefined polarity and voltage, the commutation switch positive branch 122-1 and the commutation switch negative branch 122-2 are completely switched off and the second circuit breaker 114 is re-closed. At this point, the voltage of the commutation capacitor C has returned to the polarity of the predefined voltage and the DC circuit breaker device 100 satisfies the requirement of short-circuit disconnection again after re-closing.

In some examples, since the phase difference existing between the phase of the oscillation current generated by the commutation module and the voltage of the commutation capacitor C is 90°, the zero crossings of current correspond to the amplitudes of the voltage of the commutation capacitor during the oscillation cycle, i.e., the polarity of the commutation capacitor C changes at the zero crossings of current. Using this principle, the final polarity of the commutation capacitor C may be controlled through the zero crossings of current.

The above process of disconnecting and re-closing is achieved only through a simple circuit structure with charging and discharging of capacitor current to achieve a DC circuit breaker device capable of efficient re-closing.

The block diagrams of the circuits, devices, apparatus, equipment, systems involved in this disclosure are intended as exemplary examples only and are not intended to require or imply that they must be connected, arranged, configured in the manner illustrated in the block diagrams. As will be recognized by those skilled in the art, these circuits, devices, apparatus, equipment, systems may be connected, arranged, configured in any way, as long as the desired purpose can be achieved.

It should be understood by those skilled in the art that the above specific embodiments are examples only and not limitations, and that various modifications, combinations, partial combinations and substitutions of embodiments of this disclosure may be made according to design requirements and other factors, so long as they are within the scope of the appended claims or their equivalents, which fall within the scope claimed by this disclosure.

The invention claimed is:

1. A DC circuit breaker device comprising:
a circuit breaker module comprising a first circuit breaker and a second circuit breaker connected in series with the first circuit breaker for connecting a load and a DC power source in a DC circuit system;
a commutation module connected in parallel with the first circuit breaker and comprising a commutation capacitor, a commutation switch module and a commutation inductor connected in series; the commutation switch module comprising a commutation switch positive branch and a commutation switch negative branch connected in parallel, the commutation switch positive branch and the commutation switch negative branch being capable of being controllably switched on/off; and
a control module coupled to the circuit breaker module and the commutation module, and configured to control the switching on/off of the commutation switch positive branch and the commutation switch negative branch after the first circuit breaker is re-closed, so that the commutation capacitor is charged/discharged to a predefined polarity and voltage that satisfies a requirement for the first circuit breaker to disconnect again,
wherein the control module is further configured to:
in event of a short-circuit fault in the DC circuit system, control the first circuit breaker to disconnect and control switching on of the commutation switch positive branch and the commutation switch negative branch to cause a current flowing through the first circuit breaker to cross zero;
disconnect the second circuit breaker after the current flowing through the first circuit breaker crosses zero;
re-close the first circuit breaker and switch on the commutation switch positive branch and the commutation switch negative branch to establish a first loop comprised of the first circuit breaker and the commutation module;
detect a polarity and voltage of the commutation capacitor and control switching on/off of the commutation switch positive branch and the commutation switch negative branch based on detected polarity and voltage and the predefined polarity and voltage, so that the commutation capacitor is charged/discharged to the predefined polarity and voltage; and
switch off the commutation switch positive branch and the commutation switch negative branch and re-close the second circuit breaker when the voltage of the commutation capacitor is charged/discharged to the predefined polarity and voltage.

2. The DC circuit breaker device of claim 1, wherein
the commutation switch positive branch comprises a first set of semiconductor devices, and the first set of semiconductor devices comprises at least one first controllable semiconductor switch device for controlling switching on of the commutation switch positive branch in a positive direction; and
the commutation switch negative branch circuit comprises a second set of semiconductor devices, and the second set of semiconductor devices comprises at least one second controllable semiconductor switch device for controlling switching on of the commutation switch negative branch circuit in a negative direction.

3. The DC circuit breaker device of claim 2, wherein
the at least one first controllable semiconductor switch device and the at least one second controllable semiconductor switch device comprise at least one fully controllable semiconductor switch device and/or at least one semi-controllable semiconductor switch device, respectively.

4. The DC circuit breaker device of claim 2, wherein
the first set of semiconductor devices further comprises at least one first uncontrollable semiconductor device connected in series with the at least one first controllable semiconductor switch device; and
the second set of semiconductor devices further comprises at least one second uncontrollable semiconductor device connected in series with the at least one second controllable semiconductor switch device.

5. The DC circuit breaker device of claim 2, wherein
the first set of semiconductor devices and the second set of semiconductor devices have the same combination of semiconductor switch devices and are connected in a reverse parallel mode.

6. The DC circuit breaker device of claim 1, further comprising a first arrester connected in parallel with a series circuit formed by the commutation capacitor and the commutation switch module.

7. The DC circuit breaker device of claim 1, wherein
the commutation module further comprises a second arrester connected in parallel with the commutation switch module, and the second arrester is used to absorb energy of the commutation capacitor when a voltage of the commutation capacitor is greater than an operating voltage of the second arrester.

8. The DC circuit breaker device of claim 1, wherein the commutation module further comprises a third circuit breaker connected in series with the commutation switch module.

9. The DC circuit breaker device of claim 1, wherein detecting a polarity and voltage of the commutation capacitor and controlling switching on/off of the commutation switch positive branch and the commutation switch negative branch based on detected polarity and voltage and the predefined polarity and voltage comprises:
alternately switching on the commutation switch positive branch and the commutation switch negative branch and detecting the polarity and voltage of the commutation capacitor and switching the switching on of the commutation switch positive branch and the commutation switch negative branch at zero crossings of current of the first loop, until the polarity and voltage of the commutation capacitor satisfies the predefined polarity and voltage.

10. The DC circuit breaker device of claim 1, wherein detecting a polarity and voltage of the commutation capacitor and controlling switching on/off of the commutation switch positive branch and the commutation switch negative branch based on detected polarity and voltage and the predefined polarity and voltage comprises:
detecting the polarity and voltage of the commutation capacitor in an initial state after re-closing the first circuit breaker;
calculating, according to the detected polarity and voltage in the initial state and the predefined polarity and voltage, the number of zero crossings of current of the first loop required to charge/discharge the commutation capacitor from the polarity and voltage in the initial state to the predefined polarity and voltage; and
controlling, based on the number of zero crossings of current of the first loop, switching on/off of the commutation switch positive branch and the commutation switch negative branch so that the commutation switch positive branch and the commutation switch negative branch are switched off after the current of the first loop crosses zero up to the number of zero crossings of current.

11. A control method for controlling a DC circuit breaker device of claim 1, the control method comprising:
in event of a short-circuit fault in the DC circuit system, controlling the first circuit breaker to disconnect and controlling switching on of the commutation switch positive branch and the commutation switch negative branch to cause a current flowing through the first circuit breaker to cross zero;
disconnecting the second circuit breaker after the current flowing through the first circuit breaker crosses zero;
re-closing the first circuit breaker and switching on the commutation switch positive branch and the commutation switch negative branch to establish a first loop comprised of the first circuit breaker and the commutation module;
detecting a polarity and voltage of the commutation capacitor and controlling switching on/off of the commutation switch positive branch and the commutation switch negative branch based on detected polarity and voltage and a predefined polarity and voltage, so that the commutation capacitor is charged/discharged to the predefined polarity and voltage; and
switching off the commutation switch positive branch and the commutation switch negative branch and re-closing the second circuit breaker when the voltage of the commutation capacitor is charged/discharged to the predefined polarity and voltage.

* * * * *